US012646420B2

(12) United States Patent
Yasuda et al.

(10) Patent No.: US 12,646,420 B2
(45) Date of Patent: Jun. 2, 2026

(54) AUDIO CUES FOR DRIVER TRAINING

(71) Applicant: Toyota Research Institute, Inc., Los Altos, CA (US)

(72) Inventors: Hiroshi Yasuda, San Francisco, CA (US); Jean Marcel dos Reis Costa, San Jose, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 386 days.

(21) Appl. No.: 18/232,643

(22) Filed: Aug. 10, 2023

(65) Prior Publication Data

US 2025/0054410 A1 Feb. 13, 2025

(51) Int. Cl.
*G09B 19/16* (2006.01)
*G09B 5/04* (2006.01)
(52) U.S. Cl.
CPC ............. *G09B 19/167* (2013.01); *G09B 5/04* (2013.01)
(58) Field of Classification Search
CPC ...... G09B 19/16; G09B 19/167; B60K 35/28; B60K 2360/167; B60K 2360/171
See application file for complete search history.

(56) References Cited

U.S. PATENT DOCUMENTS

| | | | |
|---|---|---|---|
| 5,921,780 A | 7/1999 | Myers | |
| 6,227,862 B1 | 5/2001 | Harkness | |
| 7,062,895 B1 | 6/2006 | Sperie | |
| 7,892,078 B2 | 2/2011 | Tipping et al. | |
| 8,393,944 B2 | 3/2013 | Tipping et al. | |
| 9,533,619 B2 | 1/2017 | Minikey, Jr. et al. | |
| 10,713,543 B1 | 7/2020 | Skuin et al. | |
| 10,786,033 B2 | 9/2020 | Brown et al. | |
| 11,363,402 B2 | 6/2022 | Claar | |
| 11,532,172 B2 | 12/2022 | Skuin et al. | |
| 2014/0244265 A1* | 8/2014 | Ashbrook .......... | G01C 21/3629 704/270 |
| 2015/0258996 A1 | 9/2015 | Victor et al. | |
| 2020/0184849 A1 | 6/2020 | Spence et al. | |
| 2020/0207272 A1 | 7/2020 | Matsuo et al. | |
| 2021/0192975 A1* | 6/2021 | Spence ................ | G01C 21/365 |
| 2021/0237760 A1 | 8/2021 | Tucker | |
| 2022/0148317 A1 | 5/2022 | Herrmann et al. | |
| 2022/0189310 A1 | 6/2022 | Kendall et al. | |
| 2023/0394989 A1* | 12/2023 | Hill ........................ | G09B 19/16 |

* cited by examiner

*Primary Examiner* — Robert J Utama
(74) *Attorney, Agent, or Firm* — Christopher G. Darrow; Darrow Mustafa PC

(57) ABSTRACT

Systems, methods, and other embodiments described herein relate to training a vehicle driver using audio cues. In one embodiment, a method includes determining a deviation of a vehicle between an actual path of the vehicle and an ideal path. The ideal path defines a position and a velocity of the vehicle to optimize driving time through a current section of a road. The method includes generating an audible cue within the vehicle to indicate to a driver the deviation from the ideal path.

15 Claims, 5 Drawing Sheets

Audio
Strategy

Audio
System
320

Audio System 320

720

---

800

120

710

310

730

110

240

260

130

Audio Strategy

Path = Sound 1

Speed = Sound 2

320

---

800

120

810

Audio Strategy

Simulated Sounds

320

110

900

910          GENERATE AUDIO STRATEGY

920          Determine Ideal Path And Actual Path

930          Determine Deviation Of Actual Path From The Ideal Path

940          Generate The Audible Cue TO CONVEY The DEVIATION

950          MODIFY STRATEGY?          YES          ALTER AUDIO STRATEGY          960

NO

970          CALCULATE EFFECTIVENESS OF The Audible Cue

AUDIO CUES FOR DRIVER TRAINING

TECHNICAL FIELD

The subject matter described herein relates, in general, to training a vehicle driver and, more particularly, to providing audio cues to a driver to optimize vehicle control.

BACKGROUND

As vehicles and technology have advanced, the potential for faster speeds and more advanced handling have improved. However, such advancements correspond with greater precision and increased reaction times. In some approaches, training a driver involves verbal instructions to the driver from an instructor and/or following a training vehicle around a track. The reduction in reaction time associated with faster speeds can make verbal instructions impractical as a driver is forced to mentally digest words into racing control actions. Following a car can also be an impractical manner of training a driver of a racecar with advanced capabilities as the proper velocity and position around sections of a track can be difficult to discern, particularly in technically challenging portions of a track. Accordingly, there is a continued goal of providing optimized racing training.

SUMMARY

In one embodiment, example audio systems relate to customizing audio to provide training of optimal path and velocity to a driver.

In an example embodiment, an audio system is disclosed. The system includes, in one configuration, a processor connected to a memory. The memory stores instructions, that when executed by the processor, cause the processor to determine a deviation of a vehicle between an actual path of the vehicle and an ideal path. The ideal path defines a position and a velocity of the vehicle to optimize driving time through a current section of a road. The instructions include instructions to generate an audible cue within the vehicle to indicate to a driver the deviation from the ideal path.

In one embodiment, a non-transitory computer-readable medium is disclosed. The non-transitory computer-readable medium includes instructions that, when executed by one or more processors, cause the one or more processors to perform one or more functions. The instructions include instructions to determine a deviation of a vehicle between an actual path of the vehicle and an ideal path. The ideal path defines a position and a velocity of the vehicle to optimize driving time through a current section of a road. The instructions include instructions to generate an audible cue within the vehicle to indicate to a driver the deviation from the ideal path.

In another example, a method is disclosed. The method includes determining a deviation of a vehicle between an actual path of the vehicle and an ideal path. The ideal path defines a position and a velocity of the vehicle to optimize driving time through a current section of a road. The method includes generating an audible cue within the vehicle to indicate to a driver the deviation from the ideal path.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 1 illustrates one example of a road that is a racetrack in which present embodiments may be implemented.

FIG. 2 illustrates an example environment implementing various embodiments of an audio system.

FIG. 3 illustrates an example environment in which assorted embodiments can customize audio with an audio system.

DETAILED DESCRIPTION

Figure 4:
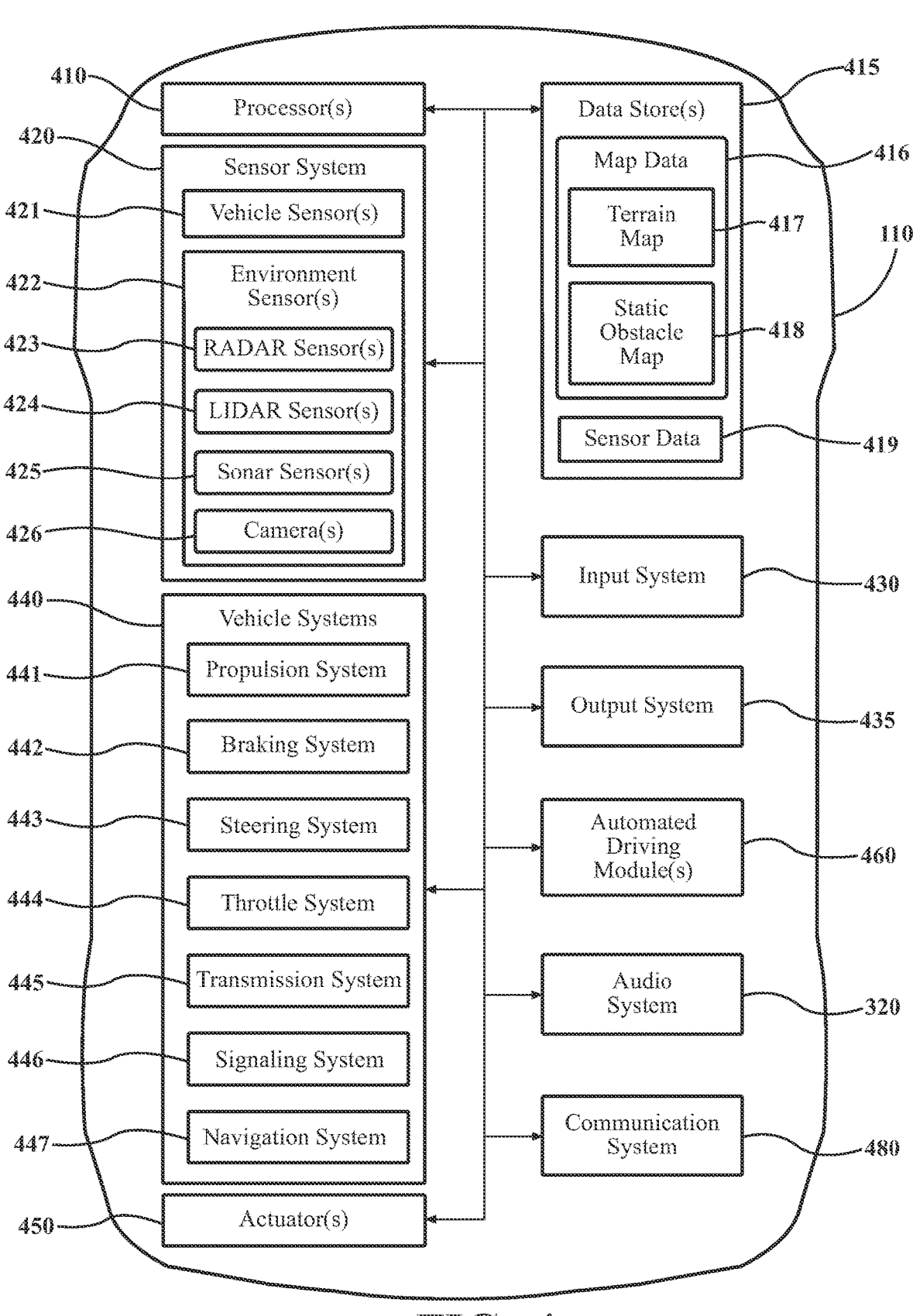
FIG. 4 illustrates one embodiment of a vehicle within which various systems and methods disclosed herein may be implemented.

Systems, methods, and other embodiments associated with optimizing driver training using audio cues are disclosed herein. As previously described, various training techniques can be ineffective for modern vehicles that exhibit greater velocity and responsiveness. In particular, when a vehicle is a racecar or other high-performance vehicle, the timing of driver inputs in regard to steering, braking, and acceleration can be especially important as slight discrepancies from an optimal input can lead to increased time to traverse a course, such as a racetrack or can lead to situations that are possibly unsafe.

Therefore, the disclosed systems, methods, and other embodiments improve how training instructions are conveyed to a driver. The use of audio to convey to a driver how a vehicle is performing can provide optimized training of how a vehicle should be operated to achieve optimal performance for a given road (e.g., racetrack) and vehicle configuration. The ability to generate audio customized to convey racing parameters while driving allows for more efficient mental processing and execution of actions to improve racing results.

Figures 1, 2, 3:
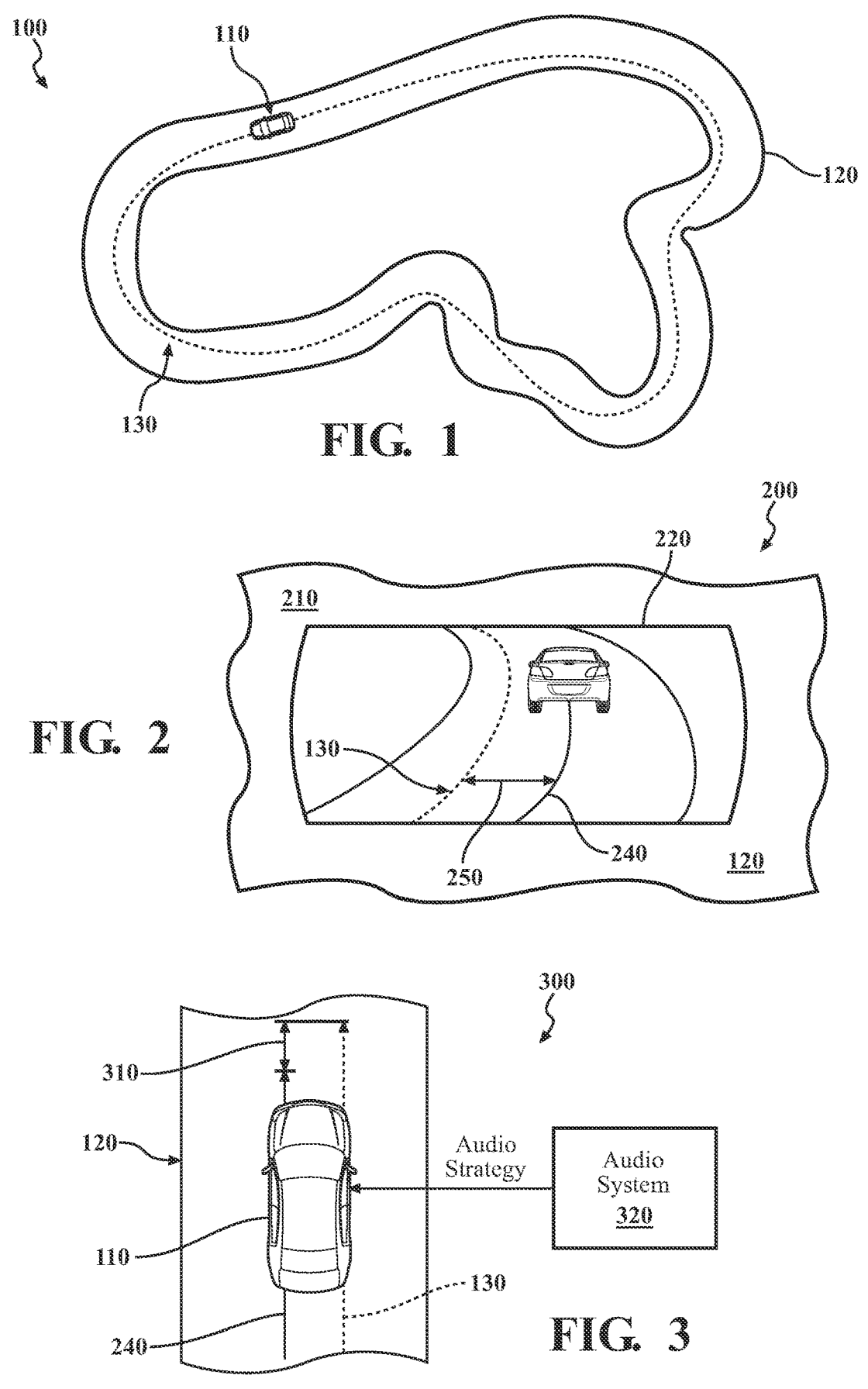

FIG. 1 illustrates a driving environment 100. The driving environment 100 is one example of an environment in which a vehicle implementing the present approach may operate. While the environment 100 is shown as a closed-loop racetrack, in other embodiments, the environment 100 may be a public road. In various implementations, a vehicle 110, such as a racecar, motorcycle, boat, or other motorized form of transportation is powered to move around a racetrack 120 in response to control by a driver. As shown by a segmented line, the racetrack 120 has an ideal path 130 that corresponds with optimal position and vehicle dynamics to achieve a minimum lap time according to a particular configuration of the vehicle 100.

As one aspect, while testing different vehicle configurations, verbal instructions can be conveyed to a driver via wireless communication and audio component in a helmet of the driver. Such verbal instructions can further train a driver to control the vehicle 110 with actions that better conform to the ideal path 130. That is, verbal communications can provide instructions to a driver to alter vehicle acceleration, braking, and/or steering to attain and maintain the ideal path 130 around the track 120. Yet, as vehicle velocities increase, such verbal instructions can be difficult to understand and correlate to vehicle actions in time to maintain the ideal path 130. It should be appreciated that depending on various circumstances, the ideal path 130 may be defined differently. For example, in the context of a public road, the ideal path 130 may be defined according to a safest path, according to a quickest path that complies with local laws and regulations, and so on.

FIG. 2 illustrates portions of another driving environment 200 in which assorted embodiments of an audio system, as described further subsequently, can be practiced. The driving environment 200 depicts a view from within a helmet 210, and through a visor 220, worn by a racecar driver while following a lead vehicle 230 around a racetrack 120. By following a lead vehicle 230, a driver can learn, on-track, the ideal path 130 to produce peak performance, as measured by a lap time.

Despite having direct visual cues to train the ideal path 130 by following a lead vehicle 230, training can be inefficient and potentially dangerous due to circumstances of closely following another vehicle. For instance, following the lead vehicle 230 can present collision risks that can pose safety hazards. Training via following the lead vehicle 230 can also be inefficient, particularly in technically challenging portions of the racetrack 120 where an actual path 240 is difficult to ascertain. In addition, following the lead vehicle 230 can be inefficient in visually discerning deviations in velocity and position, as shown by arrows 250, can be difficult to identify and translate into corrective vehicle control actions. As another example, faster velocities and greater vehicle capabilities, such as brake forces, lateral G-forces, and acceleration rates, can be difficult for a driver to identify from the lead vehicle 230 and translate into vehicle controls that result in the ideal path 130.

It is noted that various visual supplements can aid training behind the lead vehicle 230. However, the addition of visual aids can be overwhelming, confusing, and difficult to translate into controls that produce the ideal path 130. Accordingly, various embodiments are directed to audible training cues that are simple to translate into an understanding of how the vehicle compares to the ideal path 130, which can eliminate the safety risk presented by following the lead vehicle 230.

FIG. 3 illustrates portions of an example system 300 configured to carry out various embodiments associated with audio customized by an audio system 320. FIG. 3 conveys how a the actual path 240 of a vehicle can deviate from the ideal path 130, as measured by distance 250 and also velocity difference 310, as shown between the length of the ideal path 130 and the actual path 240.

In response to determination of the actual path 240, an audio system 320, in one approach, executes a predetermined audio strategy that indicates how the actual path 240 compares to the ideal path 130. That is, the audio system 320 utilizes, in at least one configuration, one or more sensors to detect how the vehicle is performing (i.e., via the actual path 240) and compare that performance to the ideal path 130, which prompts the audible execution of an audio strategy inside, in at least one arrangement, a helmet of the driver of the vehicle 110 to convey the deviations from the ideal path 130. It should be appreciated that the audio system 320 may determine the performance of the vehicle 110 via the actual path in different ways and similarly the ideal path 130. For example, the audio system 320 may explicitly localize the vehicle 110 on the road along with determining a current velocity, which is, for example, defined as a vector quantity, i.e., heading and velocity. Similarly, the audio system 320 may dynamically determine the ideal path 130 according to current conditions and a geometry of the road. In further aspects, the audio system 320 uses a predefined path as the ideal path 130 that is, for example, determined according to a geometry of the road and/or a path defined by an expert driver.

In any case, the use of audible cues, as opposed to visual or haptic cues, can provide easily discernible information about how the driver is performing compared to the ideal path 130 and velocity, which allows for efficient alteration of vehicle control actions while traversing a road/track.

Referring to FIG. 4, an example of the vehicle 110 in which the audio system 320 may be implemented is illustrated. As used herein, a "vehicle" is any form of transport that may be motorized or otherwise powered. In one or more implementations, the vehicle 110 is an automobile. While arrangements will be described herein with respect to automobiles, it will be understood that embodiments are not limited to automobiles.

The vehicle 110 also includes various elements. It will be understood that, in various embodiments, it may not be necessary for the vehicle 110 to have all of the elements shown in FIG. 4. The vehicle 110 can have different combinations of the various elements shown in FIG. 4. Further, the vehicle 110 can have additional elements to those shown in FIG. 4. In some arrangements, the vehicle 110 may be implemented without one or more of the elements shown in FIG. 4. While the various elements are shown as being located within the vehicle 110 in FIG. 4, it will be understood that one or more of these elements can be located external to the vehicle 110. Further, the elements shown may be physically separated by large distances. For example, as discussed, one or more components of the disclosed system can be implemented within the vehicle 100 while further components of the system are implemented within a cloud-computing environment or other system that is remote from the vehicle 110.

Some of the possible elements of the vehicle 110 are shown in FIG. 4 and will be described along with subsequent figures. However, a description of many of the elements in FIG. 4 will be provided after the discussion of FIGS. 5-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 110 includes the audio system 320 that is implemented to perform methods and other functions as disclosed herein relating to improving training a driver to control the vehicle 110.

Figures 5, 6:
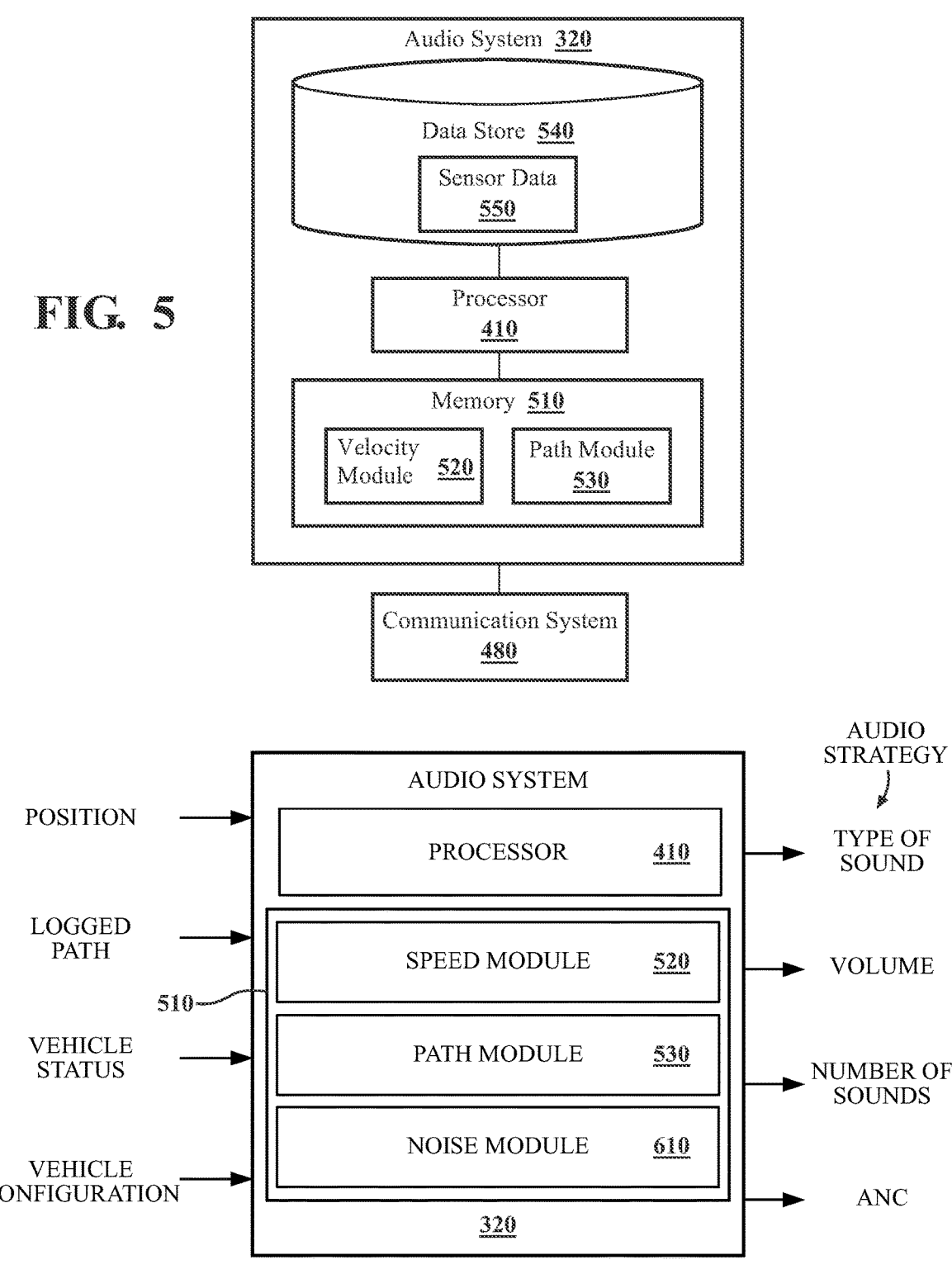
FIG. 5 illustrates one embodiment of an audio system that is associated with using audio cues to train a driver.
FIG. 6 illustrates another example audio system.

With reference to FIG. 5, one embodiment of the audio system 320 of FIGS. 3-4 is further illustrated. The audio system 320 is shown as including a processor 410 from the vehicle 110 of FIG. 4. Accordingly, the processor 410 may be a part of the audio system 320, the audio system 320 may include a separate processor from the processor 410 of the vehicle 110, or the audio system 320 may access the processor 410 through a data bus or another communication pathway.

In one embodiment, the audio system 320 includes a memory 510 that stores a velocity module 520 and a path module 530. The memory 510 is a random-access memory (RAM), read-only memory (ROM), a hard-disk drive, a flash memory, or another suitable memory for storing the modules 520 and 530. The modules 520 and 530 are, for example, computer-readable instructions that when executed by the processor 410 cause the processor 410 to perform the various functions disclosed herein. In alternative arrangements, the modules 520 and 530 are independent elements from the memory 510 that are, for example, comprised of hardware elements. Thus, the modules 520 and 530 are alternatively ASICs, hardware-based controllers, a composition of logic gates, or another hardware-based solution.

Moreover, in one embodiment, the audio system 320 includes the data store 540. The data store 540 is, in one embodiment, an electronic data structure stored in the memory 510 or another data storage device and that is configured with routines that can be executed by the processor 410 for analyzing stored data, providing stored data, organizing stored data, and so on. Thus, in one embodiment, the data store 540 stores data used by the modules 520 and 530 in executing various functions. In one embodiment, the data store 540 stores the sensor data 550 along with, for example, metadata that characterize various aspects of the sensor data 550. For example, the metadata can include location coordinates (e.g., longitude and latitude), relative map coordinates or tile identifiers, time/date stamps from when the separate sensor data 550 was generated, and so on. Additionally, the audio system 320 as illustrated in FIG. 5 is generally an abstracted form of the audio system 320 as may be implemented between the vehicle 110 and a cloud-computing environment. That is, in various arrangements, the audio system 320 may be implemented as separate instances, such as a client instance in the vehicle 110 and a server instance within the cloud-computing environment with which the client instance communicates. Broadly speaking, the client instance at the vehicle 110 can offload processing request to the server instance in order to shift processing to the cloud-environment for various determinations, such as determination of the ideal path.

FIG. 6 illustrates another example of the audio system 320 in accordance with various embodiments. The audio system 320, in at least one configuration, includes hardware circuitry, such as semiconductors, programmable circuitry, and application specific integrated circuits (ASIC), along with software, such as computer readable code or other computer instructions, that are physically present within the vehicle 110. Along those lines, it is contemplated that portions of the audio system 320 contain wired connections within a vehicle 110 while other portions are present external of the vehicle 110 and communicate via one or more wireless communication pathways to the vehicle 110.

Regardless of the physical location, or communication means for data, the audio system 320 can employ the one or more processors 410 that translate assorted input information into at least one audio strategy that is stored in a local system memory 510. An audio strategy generated by the audio system 320 can input assorted information detected from one or more sensors, stored in the memory 510, and/or stored in an external memory. For instance, the audio system 320 can input a current position on a road, a logged path, a vehicle status, and a vehicle configuration to determine an audio strategy that may, or may not, factor in the current, real-time deviation of the racecar from an ideal path as well as what corrective actions can be taken by the driver to conform future driving behavior to the ideal path. In general, the vehicle configuration can be characterized as the dynamic behavior of physical components of the vehicle, such as a suspension, brakes, an engine, aerodynamic features, and so on.

An audio strategy generated by the audio system 320 generally includes defined audio characteristics that the audio system 320 selects to efficiently communicate to the driver about performance relative to the ideal path. As one example, an audio strategy may define one or more types of sounds to convey an ideal velocity and an ideal position, a volume of a selected sound according to a deviation, a number of sounds concurrently playing to a driver, and any active noise cancellation (ANC) settings. The proactive generation of an audio strategy, in some embodiments, defines a variety of different audio characteristics that the system 320 plays to the driver in response to actions of the driver and a resulting deviation of the vehicle 110. It should be appreciated that the audio strategy can define the sound also the manner of adapting/modulating the sound through variations in a type (e.g., different sounds, such as notes, audio clips, etc.), a form of playback (e.g., pace/rhythm, tone, frequency, period of playback for a sound, etc.), and so on. As such, the audio system 320 may continuously monitor a deviation from the ideal path (e.g., velocity and position) and provide feedback that varies according to an extent and type of the deviation.

In order to generate and intelligently execute portions of an audio strategy, the audio system 320 evaluates one or more detected aspects of vehicle operation to determine variation from an ideal velocity and position defining the the ideal path. The system 320 can employ the velocity module 520 to correlate different regions of a racetrack with different velocities as well as what sound(s) best communicate to a driver a current deviation from and ideal velocity at a particular region of the road/track. As a result of work by the velocity module 520, an audio strategy can have a variety of different ideal operating velocities, or average velocities, at selected regions of a road/track with the different regions having common, or customized, sounds to convey, in real-time, the deviation of the vehicle from an ideal velocity.

Similarly, the system 320 can employ a path module 530 to generate an ideal path along a road/track, which may include specific consideration of a vehicle configuration (e.g., a known setup of the vehicle 110, including steering, suspension, etc.). That is, the path module 530 can create a new ideal path or modify a previously known ideal path around a track/road that correlates to the optimal (e.g., fastest) line attainable for a vehicle with a given configuration and within realistic operating parameters for a driver, such as reaction times, G-forces, and muscle strength. The path module 530 can assign different characteristics at selected portions of a track/road to convey the current deviation the ideal path.

The ability to assign different types and numbers of sounds as well as dynamic volumes and other characteristics as part of an audio strategy for selected sections of a track allows for optimized communication that can be easily understood by a driver and translated into tangible control actions to reduce the deviations in velocity and/or path. In other words, the prescribed dynamic audible cues of the audio strategy associated with indicating a vehicle's current deviation from an ideal velocity and position for particular sections of a track/road efficiently conveys steering, acceleration, and braking actions that can improve control, such as lap times.

While audible communication with a driver during training can involve the playback of selected sounds, various embodiments populate an audio strategy with noise cancellation to complement the playback of sound to further optimize how a velocity and position is conveyed to the driver. A noise module 610 can provide circuitry and/or software to the audio system 320 that assigns active noise cancellation of selected sounds and frequencies at particular locations. For instance, the noise module 610 can assign cancellation of one or more tire sounds during expected braking times to allow the driver to better hear, understand, and translate sound(s) of the audio strategy to racecar actions that improve deviation from the ideal path.

The proactive generation of at least one audio strategy that assigns dynamic sounds and noise cancellation around various portions of a track/road can allow the system 320 to quickly and efficiently react to detected deviations in velocity and position with sounds that convey the deviation in order to facilitate adapting the velocity/position. In at least one approach, it is contemplated that the audio system 320 maintains a strategy after initial generation by factoring in the effectiveness of sound playback for a driver according to prior occurrences (e.g., over prior laps of a track or along a road). That is, the system 320 can assess how effective previously executed sounds were at correcting deviation from ideal velocity and position to allow for subsequent alteration of the audio strategy, and/or selected regions of the track, in an attempt to improve the playback of sound(s).

Figures 7, 8A, 8B:
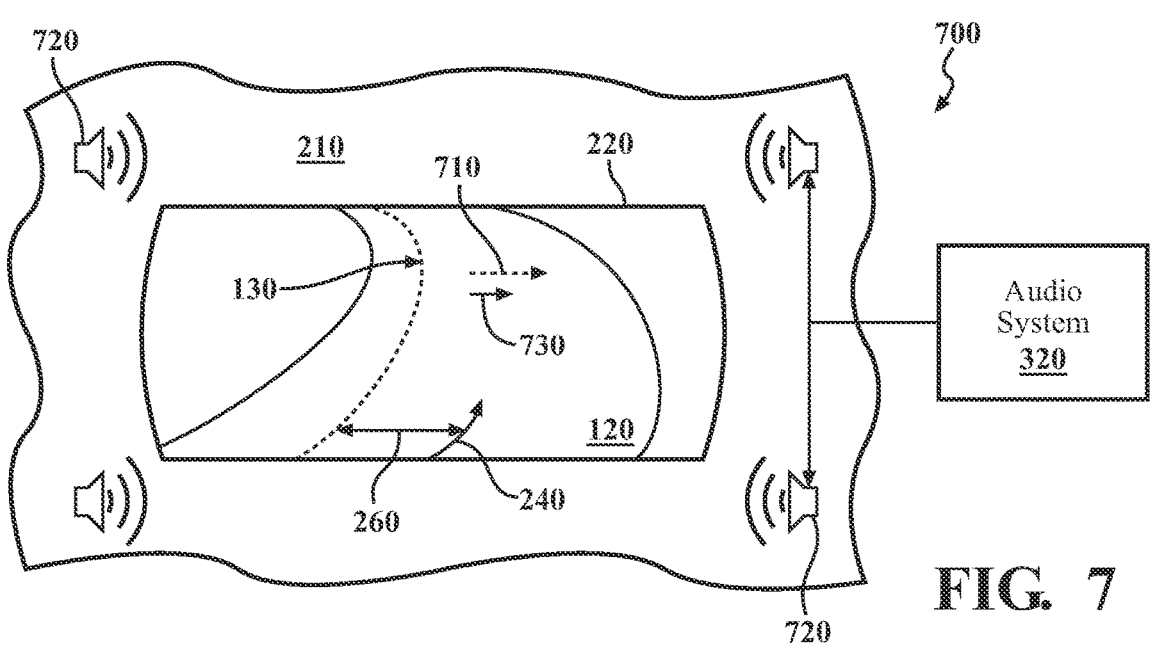
FIG. 7 illustrates yet another example embodiment of an audio system.
FIGS. 8A and 8B illustrate specific examples of using sounds as cues to a driver for training about control of a vehicle.

FIG. 7 illustrates an example environment 700 in which assorted embodiments of an audio system 320 can be employed. The perspective of FIG. 7 is from a driver through a visor 220 of a helmet 210. Such perspective shows how an ideal path 130, including a representation of a velocity 710, can be conveyed by one or more speakers, such as helmet speakers 720 and/or speakers external to the helmet 210. By executing portions of an audio strategy, at least one helmet speaker 720 emits audible sounds (e.g., tones, music, and/or audible sound bites) to convey how a vehicle is performing compared to a predetermined ideal path 130. It is contemplated that, in further embodiments, execution of an audio strategy to activate one or more helmet speakers 720 can correspond with one or more visual cues, such as augmented reality digital elements.

In accordance with some embodiments, audible cues prescribed by an audio strategy convey ideal path 130 and velocity 710 by illustrating deviations of the current/actual position/velocity compared to the ideal position/velocity. For instance, the audio system 320 can determine, in real-time, a position of a vehicle on a track/road 120 and the velocity 730 of the vehicle, which allows the audio system 320 to calculate a deviation distance 260 from the ideal path 130, including deviation from an ideal position and an ideal velocity. Such deviation is presented to the driver via one or more sounds, as directed by the audio strategy, to communicate the current status of the vehicle 110 with respect to the ideal path 130.

In other words, as a vehicle moves around a racetrack, the audio system 320 can determine how far the vehicle is from the ideal path 130 to allow the execution of portions of an audio strategy that intelligently emits audible cues to the driver to convey the racecar's deviation from the ideal path 130 (i.e., position and velocity) for a specific section of the racetrack. As an example, a series of audible cues can evolve over time, such as by changing pace, changing pitch, changing duration, changing sound, etc. to convey position and velocity of the racecar in relation to the ideal path 130 throughout a track/road.

Through the execution of an audio strategy to convey where a racecar is compared to the ideal path 130, a driver can efficiently understand the current, real-time performance of the vehicle and control actions to reduce, or eliminate, the deviations from the ideal path 130. For instance, the audio system 320 can calculate, based on detecting an actual path, whether the vehicle is slower than the ideal velocity 710 and generates one or more audio cues (i.e., sounds) through the helmet speakers 720, in accordance with an existing audio strategy, to convey to the driver the deviation the ideal velocity 710. Similarly, playback of portions of an audio strategy can provide sounds that indicate to a driver the deviation from the ideal path 130 around one or more sections of the racetrack 120.

FIGS. 8A and 8B respectively illustrate aspects of an example environment 800 in which the audio system 320 can be utilized. The top view line representation of FIG. 8A illustrates how the audio system 320 can implement portions of an audio strategy to convey the distance 260 from an actual position 240 to an ideal position with a first sound. Execution of an audio strategy by the audio system 320 can further play a second sound through one or more helmet speakers, and/or speakers mounted to the chassis of the vehicle 110, to convey the velocity deviation 310 between the actual velocity 730 and the ideal velocity for the particular portion of the racetrack 120.

In one embodiment, the audio strategy defines different types of sound, volumes for the respective sounds, and a number of sounds used to represent the amount of deviation from the respective ideal path 130. A type of sound may be a particular musical note that is played at varying velocity depending on the distance from ideal, which can be characterized as a Doppler effect. A series of musical notes may, alternatively, be played to a driver with static, or varying, intensity/volume to indicate how far a vehicle 110 is from the ideal path 130 in relation to position and/or velocity. For instance, an audio strategy can prescribe a single sound, or multiple different sounds, to convey a vehicle's position by having a dynamic volume, pulsing intensity, or varying velocity. That is, a sound can change in a variety of ways, as directed by the audio strategy, to indicate a deviation of the vehicle 110 from the ideal path 130.

In some embodiments, the audio strategy prescribes audible cues to convey the presence of a virtual vehicle to indicate the difference between the vehicle's actual path 240 compared to an ideal path 130. For instance, the audio strategy can prescribe actual vehicle sounds, such as engine, tire, brakes, and pressure changes using a Doppler effect to convey to a driver where a virtual vehicle executing the ideal path would be positioned on the racetrack 120. Separately, the vehicle may generate audible cues to influence operation of the vehicle 100 according to a virtual vehicle that is not executing the ideal path 130 but is instead executing maneuvers to influence the driver to execute the ideal path, such as accelerating away from the vehicle 110, approaching the vehicle 100 from a rear position, steering in a manner near to the vehicle 110 to influence the driver to steer differently, and so on. Through the Doppler effect the system 320 can convey whether the virtual vehicle is moving away (i.e., the instant vehicle's speed is slow) or toward (i.e., the instant vehicle's speed is fast). Another non-limiting example of an audio strategy prescribes actual vehicle sounds to convey a virtual vehicle that is not on the ideal path 130 and velocity 710 for the racetrack 120, but is positioned, virtually to prompt action by the driver, such as move left, velocity up, brake later, accelerate harder, brake lighter, etc.

The audio strategy may provide similar, or dissimilar, manners of conveying the amount 310 of divergence in a vehicle's velocity. Hence, a driver may experience two different sounds that have similar, or dissimilar, characteristics, such as type of sound, sound intensity, volume, or pulse velocity, to efficiently indicate how the vehicle 110 is performing in real-time, which allows the driver to take action to reduce the deviation 260/310 from the respective velocity and position. In some embodiments, the audio strategy plays distinctly different sounds, concurrently or sequentially, with different characteristics that allow a driver to distinguish the the deviation 310 from the ideal velocity 710 in comparison to the deviation 260 from ideal position. The ability to customize the dynamic characteristics of sound by executing an audio strategy permits efficiently conveying how the driver is performing for optimized driver training and increased chance of less deviations subsequently.

Although an audio strategy can separately convey velocity and position deviations 260/310, as shown in FIG. 8A, such operation is not required to efficiently indicate to a driver about their performance compared to the ideal velocity and position. FIG. 8B illustrates a top view line representation of another example audio strategy that conveys a racecar's position and velocity relative to a virtual training vehicle 810. The training vehicle 810, as shown in segmented lines, can be conveyed to a vehicle 110 driver by one or more sounds that simulate sounds a driver would experience if an actual vehicle was following the ideal track path with ideal velocity to provide the fastest possible lap times for the configuration of the vehicle.

To convey ideal velocity and position around a racetrack 120, the audio strategy can mimic portions of the sound(s) experienced by a driver when following a lead vehicle, as generally shown in FIG. 2. For example, the audio strategy can generate and selectively play various racecar noises, such as engine velocity, braking, tire friction, and aerodynamic sounds associated with topographical and/or barrier features of the racetrack 120. The intelligent playback of sounds associated with other vehicles can allow for efficient correlation of where the virtual vehicle 810 is relative to the driver as well as how fast the virtual vehicle 810 is travelling relative to the driver. In contrast to the potentially non-vehicle sounds played as part of the audio strategy of FIG. 8A that convey relative velocity and position via dynamic sounds characteristics, such as sound duration and frequency to convey a Doppler effect, the audio strategy of FIG. 8B varies sound intensity and modulation to convey relative velocity and position.

It is contemplated, but not required, that an audio strategy accurately depicts the location and velocity of a virtual training vehicle 810 by employing noise cancellation of one or more select frequencies that allow a driver to efficiently discern, spatially, where the virtual vehicle is located and how fast the vehicle 810 is traveling relative to the driver, which can induce the driver to understand what vehicle controls are necessary to more closely match the virtual training vehicle 810. For instance, an audio strategy can prescribe cancelling the sounds of the driver's vehicle 110 to avoid confusion with the simulated sounds of the training vehicle 810. Another non-limiting example of an audio strategy involves employing active noise cancellation of audible frequencies that are close to the frequencies of the virtual vehicle 810, which effectively accentuates the clarity and accuracy for the driver.

With the capability to convey a vehicle's deviation from ideal path 130 in a variety of different manners via an audio strategy, an audio system 320 can intelligently select between a diverse variety of audible cues that indicate how a driver is performing compared to the ideal path. Thus, the audio system 320 can switch between different audio strategies, or prescribed audible cues of a single audio strategy, to effectively convey the relative distance and velocity of the vehicle 110 compared to the ideal path 130.

The ability to selectively execute different prescribed audible cues of one or more audio strategies allows the audio system 320 to adapt to changing training conditions to provide optimized audible feedback corresponding to how the driver is performing relative to an ideal. For instance, the audio system 320 can identify that one or more audible cues are ineffective at training a driver and switches to a different audible cue to convey relative position and velocity to the driver. The audio system 320, in another example, can adjust one or more audible cues, such as type of sound, sound intensity, number of sounds, or sound volume, to optimize the accuracy and/or effectiveness of training a driver to improve deviation from ideal track velocity and position.

Figure 9:
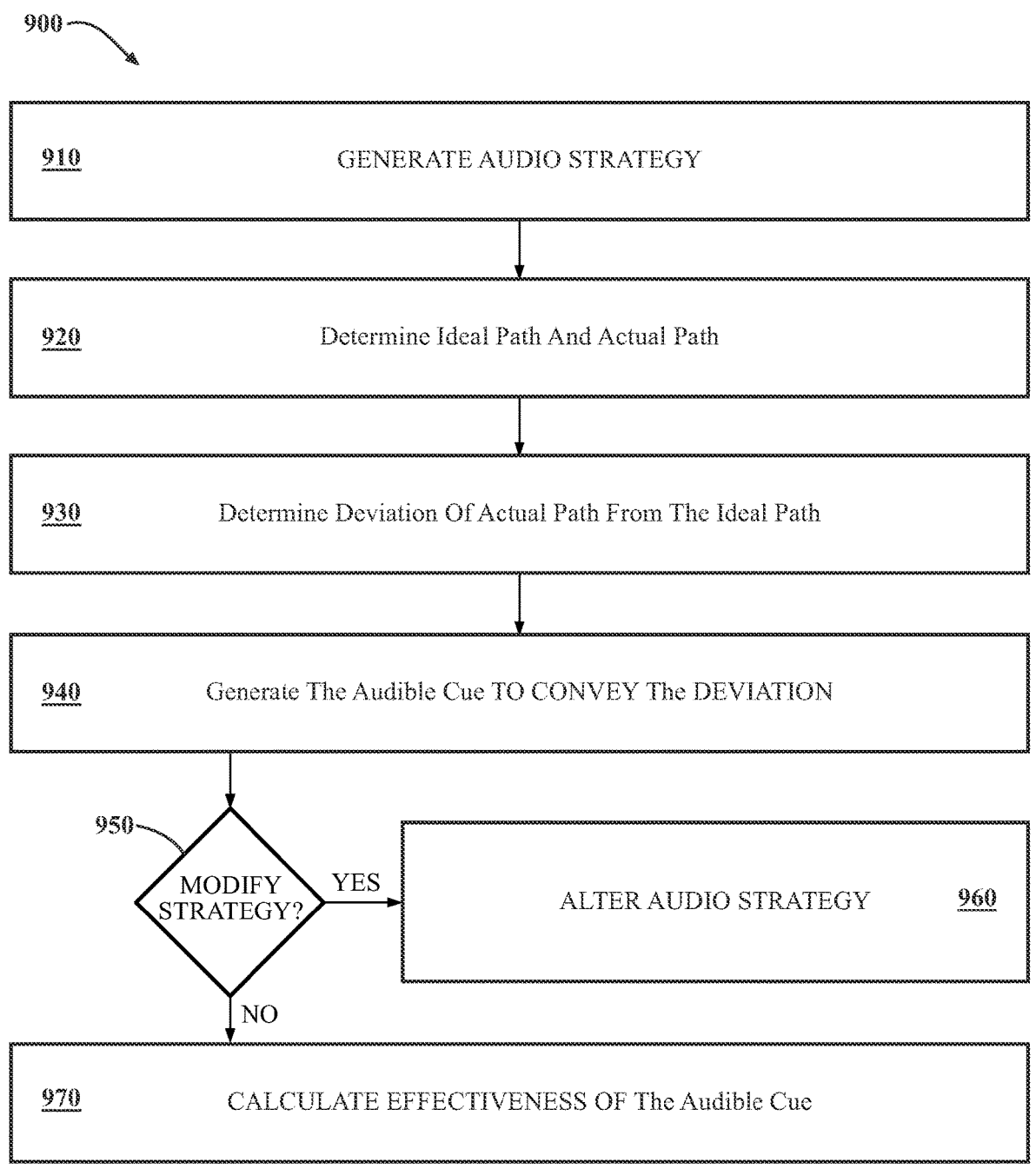
FIG. 9 illustrates a flowchart of one embodiment of a method associated with using audio cues to train a driver.

FIG. 9 illustrates a flowchart for one embodiment of an example method 900 that can be implemented by the audio system 320. It should be appreciated that while the method 900 is described in relation to the audio system 320 other systems/devices may implement the method 900.

In general, the audio system 320 acquires position and velocity information about a vehicle 110 via one or more sensors in real-time. It is noted that an audio system 320 can input a vehicle configuration to allow for the proactive computation of the ideal path around a particular racetrack. The computation of the ideal path may, in some embodiments, factor in the driving capabilities of a driver, such as maximum G-force, reaction time, and muscle strength, to ensure the path and velocities trained with the method 900 are realistic.

With the ideal path determined, the audio system 320 can generate one or more audio strategies, at 910, that prescribe audible cues for indicating deviation from the ideal path. An audio strategy can prescribe different audible cues, such as types of sound, number of sounds, sound intensity, and sound pace, etc. to efficiently convey position and velocity deviations to a driver. It is contemplated, in at least one arrangement, that the audible cues prescribed in an audio strategy change depending on if the driver is effectively translating previous audible cues into improvements in vehicle control (e.g., laptime, velocity variance, or path deviation).

The generation and storage of one or more audio strategies in the audio system allows for efficient execution of audible cues once the real-time position and velocity of the vehicle is computed, at 920. That is, the audio system 320 uses information and data from one or more sensors, such as global positioning equipment, accelerometers, proximity detectors, cameras, and other sensors to determine the current position and velocity of the vehicle on a road (e.g., a racetrack) at 920. This may involve localizing the vehicle 110 according to simultaneous localization and mapping (SLAM) or another localization technique. Moreover, as described previously, the system 320, at 920, may also determine the ideal path. In various embodiments, the approach to generating the ideal path may vary but can include dynamic generation of the ideal path according to acquired sensor data (e.g., sensor data 550), through use of a predefined ideal path, or through modification of the ideal path according to current contextual conditions, such as weather, time of day, vehicle configuration, etc.

The audio system 320 further compares the actual path, at 930, with the ideal path to calculate the deviation. In other words, at 930, the system 320 compares the actual position and velocity with ideal position and velocity to determine an amount of deviation. Accordingly, the deviation may be embodied as two separate values relating separately to the velocity and the position.

The current, real-time calculation of the deviation triggers, at 940, the system 320 to activate the prescribed audible cues from an existing audio strategy to convey the deviations to the driver. Generating the audible cues from a strategy stored in the memory of the audio system 320, at 940, provides dynamic sounds to a driver as the deviations change. Some embodiments of the generation of audible cues, at 940, involves using different prescribed cues for different sections of the road/track. It is contemplated that the system 320, in one approach, generates one or more audible cues, such as a constant tone, cancellation of a particular sound frequency, or musical playback, in the event the vehicle matches the ideal position or ideal velocity.

Through the continuous and iterative detection of driver performance and execution of audible cues indicating deviation from ideal path, the system 320 provides dynamic training to the driver without complex hardware or driver interfaces, such as augmented reality visors, haptic integration, or digital screens. That is, the execution of method 900 can be conducted with existing helmet speakers of a vehicle and/or integrated speakers of the vehicle without integration of additional hardware that can be prone to latency while adding complexity to a existing hardware systems.

While the system 320 may may iteratively perform functions described at 920-940 any number of times to aid in the training of a driver, some embodiments consider modifying an audio strategy as illustrated at 950. The audio system 320, at 950, can evaluate a number, a type, a timing, and/or other factors to determine if a modification to the strategy can improve the training of a driver. For example, at 950, the system 320 determines whether a strategy modification is to occur when existing audible cues are otherwise ineffective at decreasing deviations. It is contemplated that the system 320, at 950, prompts a modification to an existing audio strategy in response to detected behavior of the driver, such as facial gestures, speech, eye movement, or vehicle controls that indicate existing audible cues are being ignored, misunderstood, or incorrectly applied.

A determination that an existing audio strategy is to be modified, at 950, triggers the system 320 to alter the audio strategy, at 960, to increase effectiveness of audible cues. The alterations in the audio strategy, at 960, are not limited to a particular change, but can involve changing the sound, the number of sounds, volume of sound, intensity of sound, or modulation of sound emitted during a section of the racetrack.

In the event that no modification is to occur the system 320, at 970, calculates the effectiveness of the audible cues in association with locations, which allow for identification of activation of different audible cues prescribed by an audio strategy. That is, the audio system 320 can respond to the effectiveness calculated at 970 by changing one or more characteristics of the audible cues prescribed in an existing audio strategy. It is noted that effectiveness can be calculated according to a detected change in deviation in response to one or more activated audible cues.

In one or more arrangements, the one or more data stores 415 include various data elements to support functions of the vehicle 110, such as semi-autonomous and/or autonomous functions. Thus, the data store 415 may store map data 416 and/or sensor data 419. The map data 416 includes, in at least one approach, maps of one or more geographic areas. In some instances, the map data 416 can include information about roads (e.g., lane and/or road maps), traffic control devices, road markings, structures, features, and/or landmarks in the one or more geographic areas. The map data 416 may be characterized, in at least one approach, as a high-definition (HD) map that provides information for autonomous and/or semi-autonomous functions.

In one or more arrangements, the map data 416 can include one or more terrain maps 417. The terrain map(s) 417 can include information about the ground, terrain, roads, surfaces, and/or other features of one or more geographic areas. The terrain map(s) 417 can include elevation data in the one or more geographic areas. In one or more arrangements, the map data 416 includes one or more static obstacle maps 418. The static obstacle map(s) 418 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 419 is data provided from one or more sensors of the sensor system 420. Thus, the sensor data 419 may include observations of a surrounding environment of the vehicle 110 and/or information about the vehicle 110 itself. In some instances, one or more data stores 415 located onboard the vehicle 110 store at least a portion of the map data 416 and/or the sensor data 419. Alternatively, or in addition, at least a portion of the map data 416 and/or the sensor data 419 can be located in one or more data stores 115 that are located remotely from the vehicle 110.

As noted above, the vehicle 110 can include the sensor system 420. The sensor system 420 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 420 and/or the one or more sensors can be operatively connected to the processor(s) 410, the data store(s) 415, and/or another element of the vehicle 110.

Various examples of different types of sensors will be described herein. However, it will be understood that the embodiments are not limited to the particular sensors described. In various configurations, the sensor system 420 includes one or more vehicle sensors 421 and/or one or more environment sensors. The vehicle sensor(s) 421 function to sense information about the vehicle 110 itself. In one or more arrangements, the vehicle sensor(s) 421 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 110.

As noted, the sensor system 420 can include one or more environment sensors 422 that sense a surrounding environment (e.g., external) of the vehicle 110 and/or, in at least one arrangement, an environment of a passenger cabin of the vehicle 110. For example, the one or more environment sensors 422 sense objects the surrounding environment of the vehicle 110. Such obstacles may be stationary objects and/or dynamic objects. Various examples of sensors of the sensor system 420 will be described herein. The example sensors may be part of the one or more environment sensors

422 and/or the one or more vehicle sensors 421. However, it will be understood that the embodiments are not limited to the particular sensors described. As an example, in one or more arrangements, the sensor system 420 includes one or more radar sensors 423, one or more LIDAR sensors 424, one or more sonar sensors 425 (e.g., ultrasonic sensors), and/or one or more cameras 426 (e.g., monocular, stereoscopic, RGB, infrared, etc.).

Continuing with the discussion of elements from FIG. 4, the vehicle 110 can include an input system 430. The input system 430 generally encompasses one or more devices that enable the acquisition of information by a machine from an outside source, such as an operator. The input system 430 can receive an input from a vehicle passenger (e.g., a driver/operator and/or a passenger). Additionally, in at least one configuration, the vehicle 110 includes an output system 435. The output system 435 includes, for example, one or more devices that enable information/data to be provided to external targets (e.g., a person, a vehicle passenger, another vehicle, another electronic device, etc.).

Furthermore, the vehicle 110 includes, in various arrangements, one or more vehicle systems 440. Various examples of the one or more vehicle systems 440 are shown in FIG. 4. However, the vehicle 110 can include a different arrangement of vehicle systems. It should be appreciated that although particular vehicle systems are separately defined, each or any of the systems or portions thereof may be otherwise combined or segregated via hardware and/or software within the vehicle 110. As illustrated, the vehicle 110 includes a propulsion system 441, a braking system 442, a steering system 443, a throttle system 444, a transmission system 445, a signaling system 446, and a navigation system 447.

The navigation system 447 can include one or more devices, applications, and/or combinations thereof to determine the geographic location of the vehicle 110 and/or to determine a travel route for the vehicle 110. The navigation system 447 can include one or more mapping applications to determine a travel route for the vehicle 110 according to, for example, the map data 416. The navigation system 447 may include or at least provide connection to a global positioning system, a local positioning system or a geolocation system.

In one or more configurations, the vehicle systems 440 function cooperatively with other components of the vehicle 110. For example, the processor(s) 410, the audio system 320 and/or automated driving module(s) 160 can be operatively connected to communicate with the various vehicle systems 440 and/or individual components thereof. For example, the processor(s) 410 and/or the automated driving module(s) 460 can be in communication to send and/or receive information from the various vehicle systems 440 to control the navigation and/or maneuvering of the vehicle 110. The processor(s) 410, the audio system 320, and/or the automated driving module(s) 460 may control some or all of these vehicle systems 440.

As shown, the vehicle 110 includes one or more actuators 450 in at least one configuration. The actuators 450 are, for example, elements operable to move and/or control a mechanism, such as one or more of the vehicle systems 440 or components thereof responsive to electronic signals or other inputs from the processor(s) 410 and/or the automated driving module(s) 460. The one or more actuators 450 may include motors, pneumatic actuators, hydraulic pistons, relays, solenoids, piezoelectric actuators, and/or another form of actuator that generates the desired control.

As described previously, the vehicle 110 can include one or more modules, at least some of which are described herein. In at least one arrangement, the modules are implemented as non-transitory computer-readable instructions that, when executed by the processor 410, implement one or more of the various functions described herein. In various arrangements, one or more of the modules are a component of the processor(s) 410, or one or more of the modules are executed on and/or distributed among other processing systems to which the processor(s) 410 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an application-specific integrated circuit (ASIC), programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

With continued reference to the various components illustrated in FIG. 4, the vehicle 110 includes one or more processors 410. In one or more arrangements, the processor(s) 410 can be a primary/centralized processor of the vehicle 110 or may be representative of many distributed processing units. For instance, the processor(s) 410 can be an electronic control unit (ECU). Alternatively, or additionally, the processors include a central processing unit (CPU), a graphics processing unit (GPU), an ASIC, an microcontroller, a system on a chip (SoC), and/or other electronic processing units that support operation of the vehicle 110.

The vehicle 110 can include one or more data stores 415 for storing one or more types of data. The data store 415 can be comprised of volatile and/or non-volatile memory. Examples of memory that may form the data store 415 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 415 is a component of the processor(s) 410. In general, the data store 415 is operatively connected to the processor(s) 410 for use thereby.

The term "operatively connected," as used throughout this description, can include direct or indirect connections, including connections without direct physical contact. Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An audio system comprising:
a processor; and
a memory communicably coupled to the processor and storing instructions that, when executed by the processor, cause the processor to:
determine a deviation of a vehicle between an actual path of the vehicle and an ideal path, wherein the ideal path defines a position and a velocity of the vehicle to optimize driving time through a current section of a road; and
generate an audible cue within the vehicle to indicate to a driver the deviation from the ideal path including selecting the audible cue to mimic a virtual vehicle by one of: i) executing the ideal path using a Doppler effect to convey movement in relation to the vehicle as though the virtual vehicle is emitting the audible cue, ii) driving in proximity to the vehicle to influence the driver to control the vehicle along the ideal path, including approaching from a rear position of the vehicle and accelerating away from the vehicle.

2. The audio system of claim 1, wherein the instructions to determine the deviation include instructions to generate the ideal path according to at least a geometry of the road.

3. The audio system of claim 1, wherein the actual path indicates a current position of the vehicle on the road and a velocity of the vehicle, and wherein the instructions to determine the deviation include instructions to acquire sensor data about the vehicle in relation to the road and localize the vehicle on the road.

4. The audio system of claim 1, wherein the instructions to generate the audible cue include instructions to generate the audible cue by varying a pace of the audible cue according to the deviation.

5. The audio system of claim 1, wherein the instructions to generate the audible cue include instructions to generate the audible cue by at least one of modifying a type of sound of the audible cue, modifying an intensity of the audible cue according to the deviation, and varying a number of sounds concurrently playing as part of the audible cue.

6. The audio system of claim 1, wherein the road is a racetrack, wherein the instructions to determine the deviation include instructions to determine the position and the velocity of the ideal path at separate points along the racetrack.

7. A non-transitory computer-readable medium including instructions that, when executed by one or more processors, cause the one or more processors to:

determine a deviation of a vehicle between an actual path of the vehicle and an ideal path, wherein the ideal path defines a position and a velocity of the vehicle to optimize driving time through a current section of a road; and generate an audible cue within the vehicle to indicate to a driver the deviation from the ideal path including selecting the audible cue to mimic a virtual vehicle by one of: i) executing the ideal path using a Doppler effect to convey movement in relation to the vehicle as though the virtual vehicle is emitting the audible cue, ii) driving in proximity to the vehicle to influence the driver to control the vehicle along the ideal path, including approaching from a rear position of the vehicle and accelerating away from the vehicle.

8. The non-transitory computer-readable medium of claim 7, wherein the instructions to determine the deviation include instructions to generate the ideal path according to at least a geometry of the road.

9. The non-transitory computer-readable medium of claim 7, wherein the actual path indicates a current position of the vehicle on the road and a velocity of the vehicle, and wherein the instructions to determine the deviation include instructions to acquire sensor data about the vehicle in relation to the road and localize the vehicle on the road.

10. The non-transitory computer-readable medium of claim 7, wherein the instructions to generate the audible cue include instructions to generate the audible cue by varying a pace of the audible cue according to the deviation.

11. A method, comprising:

determining a deviation of a vehicle between an actual path of the vehicle and an ideal path, wherein the ideal path defines a position and a velocity of the vehicle to optimize driving time through a current section of a road; and generating an audible cue within the vehicle to indicate to a driver the deviation from the ideal path including selecting the audible cue to mimic a virtual vehicle by one of: i) executing the ideal path using a Doppler effect to convey movement in relation to the vehicle as though the virtual vehicle is emitting the audible cue, ii) driving in proximity to the vehicle to influence the driver to control the vehicle along the ideal path, including approaching from a rear position of the vehicle and accelerating away from the vehicle.

12. The method of claim 11, wherein determining the deviation includes generating the ideal path according to at least a geometry of the road.

13. The method of claim 11, wherein the actual path indicates a current position of the vehicle on the road and a velocity of the vehicle, and wherein determining the deviation includes acquiring sensor data about the vehicle in relation to the road and localizing the vehicle on the road.

14. The method of claim 11, wherein generating the audible cue includes generating the audible cue by varying a pace of the audible cue according to the deviation.

15. The method of claim 11, wherein generating the audible cue includes generating the audible cue by at least one of: modifying a type of sound of the audible cue, modifying an intensity of the audible cue according to the deviation, and varying a number of sounds concurrently playing as part of the audible cue.

* * * * *